United States Patent [19]

Mino

[11] Patent Number: 5,019,303
[45] Date of Patent: May 28, 1991

[54] PROCESS FOR PRODUCING POLYACETYLENE

[75] Inventor: Norihisa Mino, Settsu, Japan

[73] Assignee: Matsushita Electric Industrial Co., Ltd., Osaka, Japan

[21] Appl. No.: 347,213

[22] Filed: May 4, 1989

[30] Foreign Application Priority Data

May 11, 1988 [JP] Japan ................... 63-113904
Aug. 9, 1988 [JP] Japan ................... 63-198210

[51] Int. Cl.⁵ .................. B29C 41/02; C08F 38/02
[52] U.S. Cl. .................. 264/22; 264/298; 427/36; 427/47
[58] Field of Search .......... 264/22, 298; 156/246, 156/272.4; 427/36, 47

[56] References Cited

U.S. PATENT DOCUMENTS 4,798,740 1/1989 Tomida et al. ............... 427/43.1

FOREIGN PATENT DOCUMENTS 0312099 4/1989 European Pat. Off. .

OTHER PUBLICATIONS

Molecular Crystals and Liquid Crystals, vol. 96, 1983, pp. 109–120, Gordon and Breach Publishers, Inc., U.S.; C. Bubeck et al.: "Mechanisms of the Spectral Sensitization of the Diacetylene Polymerization".
Journal of Polymer Science: Polymer Letters Edition, vol. 16, 1978, pp. 205–210, John Wiley & Sons, Inc.; D. Day et al.: "Polymerization of Diacetylene Carbonic Acid Monolayers at the Gas-Water Interface".

*Primary Examiner*—James Lowe
*Attorney, Agent, or Firm*—Stevens, Davis, Miller & Mosher

[57] ABSTRACT

The present invention concerns the fields of processes for producing an organic ultrathin film having polyacetylene linkages and the resultant films. In one embodiment the process for producing the film consists of the steps forming an acetylene monomolecular film on a water surface, applying magnetic or electric field to enhance orientation, irradiating the acetylene film with an energy beam to polymerize the acetylene film into a polyacetylene film. Other embodiments for producing the film consists of the steps of forming an acetylene film by chemical absorption, applying magnetic or electric field, and irradiating the film with an energy beam. The polymerized film is useful as an electrical material having high conductivity and as an optical material having non-linear effect.

11 Claims, 14 Drawing Sheets

1···· STRAIGHT CHAIN HYDROCARBON MOLECULE
2···· WATER SURFACE
3···· BARRIER
4···· MONOMOLECULAR FILM
5···· MAGNETIC FIELD
8···· PLUS SIDE

1····STRAIGHT CHAIN HYDROCARBON MOLECULE
2····WATER SURFACE
3····BARRIER
4····MONOMOLECULAR FILM
5····MAGNETIC FIELD
8····PLUS SIDE

1····STRAIGHT CHAIN HYDROCARBON MOLECULE
6····CHLORINE ATOM
7····CARBON ATOM
9····ACETYLENE GROUP

3 ···· BARRIER
8 ···· PLUS SIDE
10 ···· X-RAY

11 ···· POLYACETYLENE

12 ···· POLYMER
13 ···· SUBSTRATE
14 ···· POLYACETYLENE FILM

20 ···· STRAIGHT CHAIN HYDROCARBON MOLECULE
21 ···· WATER SURFACE
22 ···· BARRIER
23 ···· MONOMOLECULAR FILM
24 ···· MAGNETIC FIELD
26 ···· PLUS SIDE

20 ···· STRAIGHT CHAIN HYDROCARBON MOLECULE
25 ···· CYANO GROUP
27 ···· ACETYLENE GROUP

28 ···· X-RAY

29 · · · · POLYACETYLENE

30 · · · · POLYMER
31 · · · · SUBSTRATE
32 · · · · POLYACETYLENE FILM

40 · · · · STRAIGHT CHAIN HYDROCARBON MOLECULE
41 · · · · WATER SURFACE
42 · · · · BARRIER
43 · · · · MONOMOLECULER FILM
44 · · · · MAGNETIC FIELD
47 · · · · PLUS SIDE

45 · · · · CHLORINE ATOM
46 · · · · CARBON ATOM
48 · · · · ACETYLENE GROUP

43 ···· STRAIGHT CHAIN HYDROCARBON MOLECULE
49 ···· SUBSTRATE

43 ···· STRAIGHT CHAIN HYDROCARBON MOLECULE
49 ···· SUBSTRATE
50 ···· X-RAY

49 ···· SUBSTRATE
51 ···· POLYACETYLENE FILM

60 ···· STRAIGHT CHAIN HYDROCARBON MOLECULE
61 ···· WATER SURFACE
62 ···· BARRIER
63 ···· MONOMOLECULAR FILM
64 ···· MAGNETIC FIELD
66 ····

65 ···· CYANO GROUP
67 ···· ACETYLENE GROUP

61 ···· WATER SURFACE
63 ···· MONOMOLECULAR FILM
69 ···· SUBSTRATE

63 · · · · MONOMOLECULAR FILM
69 · · · · SUBSTRATE
70 · · · · X-RAY

69 · · · · SUBSTRATE
71 · · · · POLYACETYLENE FILM

80 .... VESSEL
81 .... CHEMICAL ADSORPTION LIQUID
82 .... Si SUBSTRATE
83 .... MONOMOLECULAR ADSORPTION FILM

82 .... Si SUBSTRATE
83 .... MONOMOLECULAR ADSORPTION FILM
84 .... X-RAY
85 .... ACETYLENE GROUP
86 .... MAGNETIC FIELD

82 ···· Si SUBSTRATE
83 ···· MONOMOLECULAR ADSORPTION FILM
87 ···· POLYACETYLENE FILM

100 ···· MONOMOLECULAR FILM
101 ···· ACETYLENE GROUP
102 ···· POLYACETYLENE

200 ···· SUBSTRATE
201 ···· MONOMOLECULAR FILM
202 ···· ACETYLENE GROUP

PROCESS FOR PRODUCING POLYACETYLENE

BACKGROUND ART

Since polymers of acetylene derivatives exhibit electric conductivity and a non-linear optical effect owing to the presence of x-electron conjugated system in the molecule, they are widely studied as electrical functional materials and optical functional materials.

A well known process previously used for producing polyacetylene is a method of polymerization using a catalyst called the Shirakawa method.

On the other hand, when an amphipatic acetylene derivative having both a hydrophilic group and a hydrophobic group is used, a monomolecular film of the acetylene derivative, which is an ultra-thin film having a thickness of angstrom order, can be formed by use of the Langmuir-Blodgett method (hereinafter referred to as LB method) and further a built-up film can also be formed. Accordingly, active studies are being made on polyacetylenes using the LB method.

Further, when an acetylene derivative having a chlorosilane group at the terminal of its straight hydrocarbon chain is used, a monomolecular film of the acetylene derivative, which is an ultra-thin film having a thickness of angstrom order, can be formed by means of a liquid-phase chemical adsorption and further a built-in film can also be formed.

However, when the amphipatic acetylene derivative having a hydrophilic group and a hydrophobic group is simply spreaded over a water surface, referring to FIG. 24, the direction of the acetylene group 101 in the straight chain hydrocarbon molecules forming the monomolecular film 100 varies from molecule to molecule. Resultantly, in the succeeding polymerization effected by irradiation of an energy beam, since the direction of the conjugated double bonds formed by said polymerization is governed by the direction of the acetylene group, there is scarcely no chance for a polyacetylene 102 having a long sequence of conjugated double bonds extending in one direction to be formed, nor any method has yet been found to solve such a problem.

Similarly, in forming polyacetylene by chemical adsorption, referring to FIG. 25, when a monomolecular film of an acetylene derivative is simply formed on a substrate 200 by chemical adsorption, the direction of the acetylene group 202 in the straight chain hydrocarbon molecule forming the monomolecular film 201 varies from molecule to molecule. Resultantly, in the succeeding polymerization effected by irradiation of an energy beam, since the direction of the conjugated double bonds formed by said polymerization is governed by the direction of the acetylene group, there is scarcely no chance for a polyacetylene having a long sequence of conjugated double bonds extending in one direction to be formed, nor any method has yet been found to solve such a problem.

SUMMARY OF THE INVENTION

One process of the present invention which involves the use of the LB method is as follows. Organic molecules which are each a straight chain hydrocarbon molecule having an acetylene group and a substituent of a high polarizability or a substituent having an unpaired electron, one end of the molecule being formed of a hydrophilic group and the other end being formed of a hydrophobic group, are dissolved in an organic solvent and spreaded over a water surface. After the organic solvent has been evaporated off, the organic molecules containing the acetylene group remaining on the water surface are scraped together by means of a barrier on the water surface along the direction of the surface to form a monomolecular film on the water surface while a predetermined surface pressure is being applied thereto. During the time, a magnetic field of a predetermined strength is applied to the monomolecular film at a predetermined angle. Then the monomolecular film is, after transferred onto a predetermined substrate or in the state of the monomolecular film or formed on the water surface, irradiated with an energy beam to effect polymerization. Also at this time, a magnetic field of a predetermined strength is applied at a predetermined angle to the monomolecular film. Thus polyacetylene is formed by the above treatments.

The other process of the present invention which involves the use of chemical adsorption is as follows. Organic molecules each composed of a straight chain hydrocarbon molecule which has a chlorosilane group at the molecular terminal and has at optional position an acetylene group and a substituent of a high polarizability or a substituent having an unpaired electron are dissolved in a solvent. An optional hydrophilic substrate is immersed in the resulting solution to form a monomolecular film of the acetylene derivative on the substrate by chemical adsorption. Then, a magnetic field of a predetermined strength is applied at a predetermined angle to the monomolecular film formed on the substrate. Thereafter, an energy beam is irradiated to the monomolecular film on the substrate to effect polymerization. Also at this time, a magnetic field of a predetermined strength is applied at a predetermined angle to the monomolecular film. Thus, polyacetylene is formed by the above treatments.

The straight chain hydrocarbon molecule having an acetylene group used in the present invention has a group of a high polarizability or a group having an unpaired electron, and the directions of the above groups are determined in accordance with the angle and the strength of the magnetic field applied from outside. Therefore, when a magnetic field is applied during the time of scraping together said organic molecules spreaded over a water surface by means of a barrier, the directions of said groups become uniform. In consequence, the steric configuration of the carbon molecules and hydrogen molecules in said straight chain hydrocarbon molecule is univocally determined. At the same time, the steric direction of the acetylene group in said straight chain hydrocarbon molecule is also determined univocally. Since such a condition is common to all of the straight chain hydrocarbon molecules, the steric directions of all the acetylene groups become uniform and an excellently well-ordered monomolecular film is formed. Also, when a magnetic field is applied to said organic molecules formed on a substrate, the directions of said groups become uniform and resultantly the steric configuration of the carbon molecules and hydrogen molecules in said straight chain hydrocarbon molecule is univocally determined. At the same time, the steric direction of the acetylene group in said straight chain hydrocarbon molecule is also determined univocally. Since such a condition is common to all of the straight chain hydrocarbon molecules, the steric directions of all the acetylene groups become uniform and an excellently well-ordered monomolecular film is formed. In this state, the monomolecular film is irradiated with an energy beam, whereby monomeric acetylenes are polymerized to form polyacetylene. Application of a magnetic field permits formation of a polyacetylene having a very long sequence of conjugated double bonds.

Figure 1:
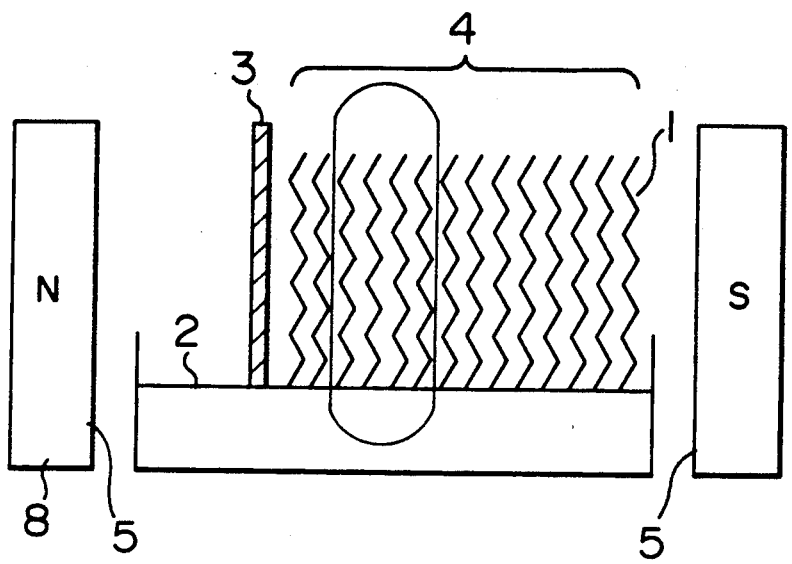
FIGS. 1 to 5 are schematic views illustrating the first embodiment of the present invention.

The numerals in the Figures mean the following. 1, 20, 40, 60: straight chain hydrocarbon molecule; 4, 23, 43, 63: monomolecular film; 5, 24, 44, 64, 86: magnetic field; 6, 45: chlorine atom; 7, 46: carbon atom; 9, 27, 48, 67, 85: acetylene group; 10, 28, 50, 70, 84: X-ray; 14, 32, 51, 71, 87: polyacetylene film; 25, 65: cyano group; 81: chemical adsorption liquid; 82: Si substrate; 83: monomolecular adsorption film.

DETAILED DESCRIPTION OF THE INVENTION

The first embodiment of the present invention will be described in detail below with reference to schematic drawings.

The straight chain hydrocarbon molecule 1 containing an acetylene group used in the present invention is an ω-tricosynoic acid derivative (CH≡C—CHCl—(CH$_2$)$_{19}$—COOH), in which a chlorine atom is attached to the carbon atom of the 3-position. The straight chain hydrocarbon molecules 1 are dissolved in chloroform and allowed to fall dropwise onto a water surface 2 to spread over the surface. After chloroform has been evaporated off, the straight chain hydrocarbon molecules 1 are scraped together by means of a barrier 3 to form a monomolecular film 4 on the water surface while a constant surface pressure is applied thereto. During the time, a magnetic field 5 is applied at the same time in a direction parallel to the water surface. Under the influence of the magnetic field, the chlorine atom 6 in said straight chain hydrocarbon molecule 1 is directed towards the plus side 8 of the magnetic field owing to polarization between the carbon atom 7 and the chlorine atom 6.

Figure 2:
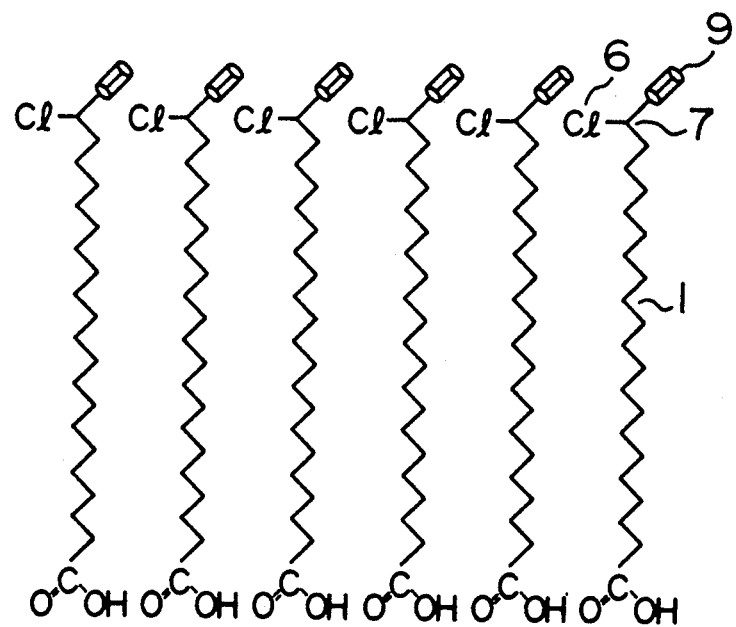

In consequence, the steric direction of the acetylene group 9 present in the straight chain hydrocarbon molecule 1 is also determined univocally. This steric direction of the acetylene group is common to the acetylene groups of all of the straight chain hydrocarbon molecules. (Reference is made to FIGS. 1 and 2, FIG. 2 being an enlarged view of the part of FIG. 1 enclosed with a circle).

Figure 3:
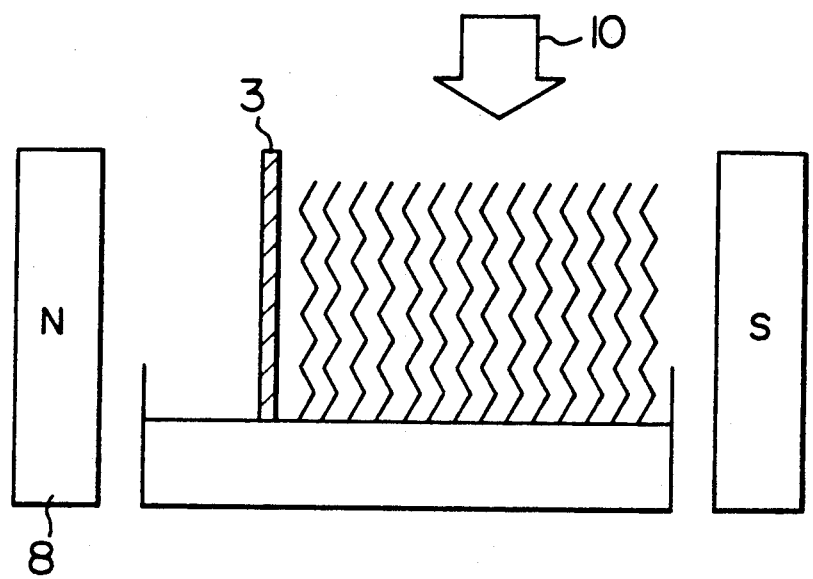
Figure 4:
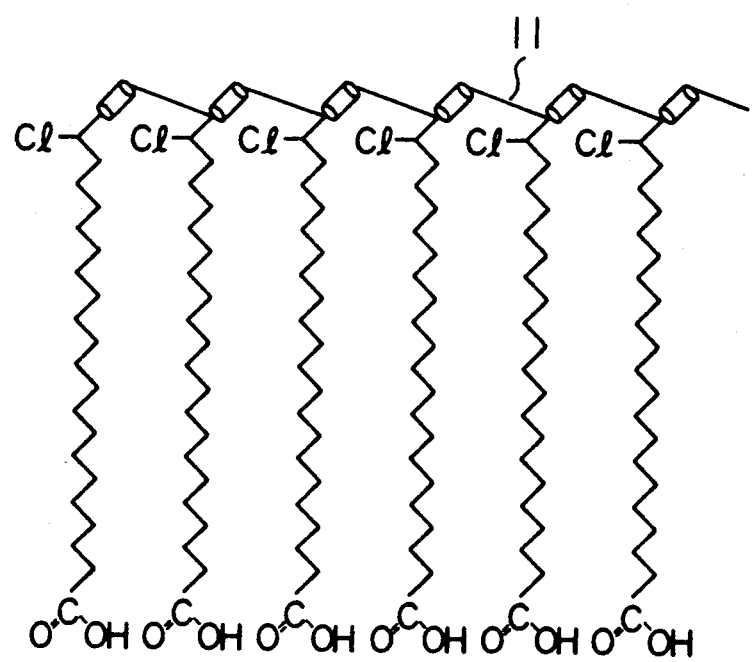

Then, the monomolecular film 4 formed on the water surface is irradiated with X-rays 10 as an energy beam. Also in this time, a magnetic field of the same direction and the same strength is applied similarly to above to make the steric directions of the acetylene groups uniform. The irradiation of X-rays 10 causes acetylene to polymerize, whereby polyacetylene 11 is formed. (Reference is made to FIGS. 3 and 4, FIG. 4 being an enlarged view of the part of FIG. 3 enclosed with a circle.)

Figure 5:
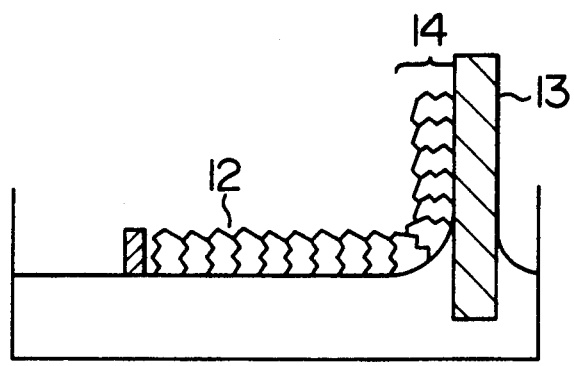

Subsequently, polymer 12 containing polyacetylene formed on the water surface is transferred onto a substrate 13 to form a polyacetylene film 14 (reference is made to FIG. 5).

The second embodiment of the present invention will be described in detail below with reference to schematic drawings.

Figure 6:
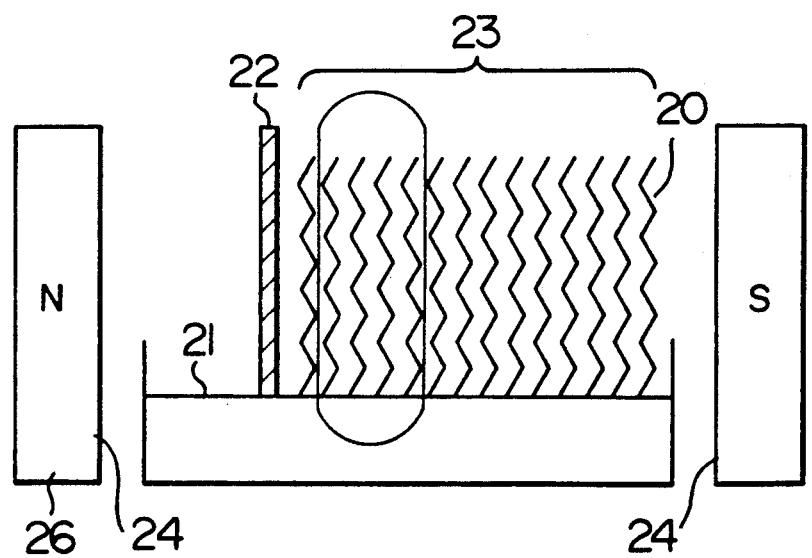
FIGS. 6 to 10 are schematic views illustrating the second embodiment of the present invention.
Figure 7:
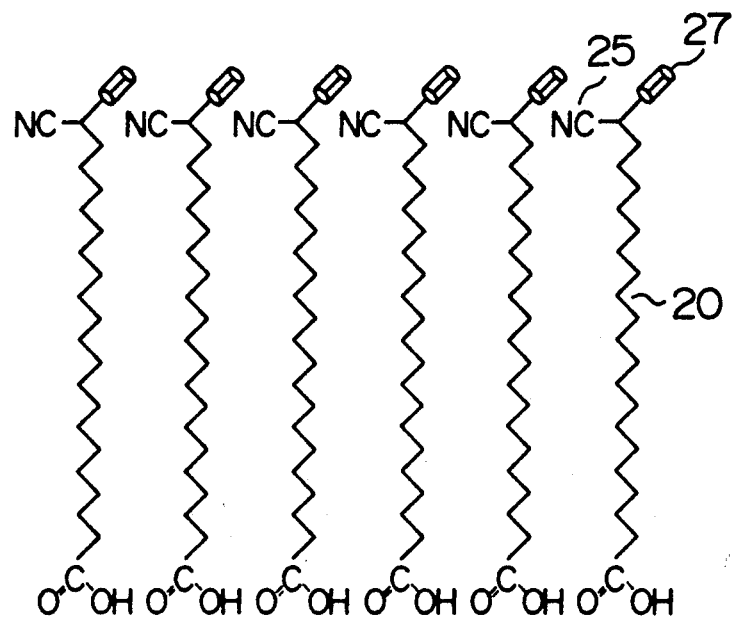

The straight chain hydrocarbon molecule 20 containing an acetylene group used in the invention is an (ω-tricosynoic acid derivative (CH≡C—CHCN—(CH$_2$)$_{19}$—COOH), in which a cyano group is attached to the carbon atom of the 3-position. The straight chain hydrocarbon molecules 20 are dissolved in chloroform and allowed to fall dropwise onto a water surface 21 to spread over the surface. After chloroform has been evaporated off, the straight chain hydrocarbon molecules 20 are scraped together by means of a barrier 22 to form a monomolecular film 23 on the water surface while a constant surface pressure is applied thereto. During the time, a magnetic field 24 is simultaneously applied in a direction parallel to the water surface. Under the influence of the magnetic field, the cyano group 25 in said straight chain hydrocarbon molecule 20 becomes diamagnetic owing to the spin effect of the unpaired electron of the nitrogen atom in the cyano group and turns toward the plus side 26 of the magnetic field. Consequently, the steric direction of the acetylene group 27 present in the straight chain hydrocarbon molecule 20 is also determined univocally. This steric direction of the acetylene group is common to the acetylene groups of all the straight chain hydrocarbon molecules. (Reference is made to FIGS. 6 and 7, FIG. 7 being an enlarged view of the part of FIG. 6 enclosed with a circle).

Figure 8:
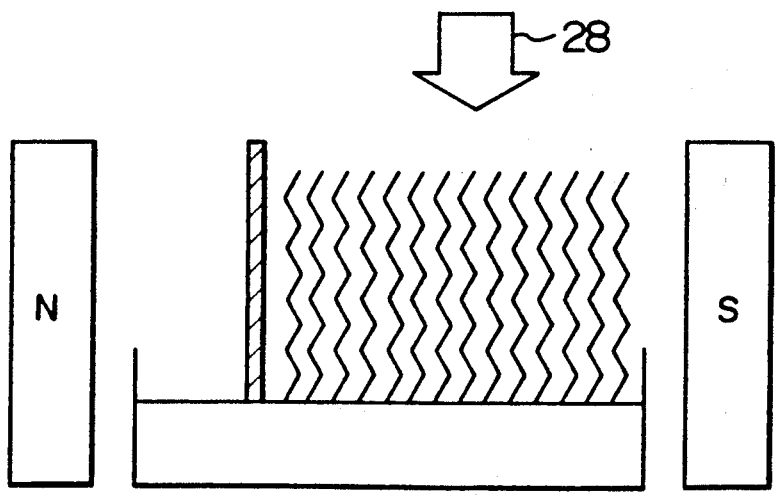
Figure 9:
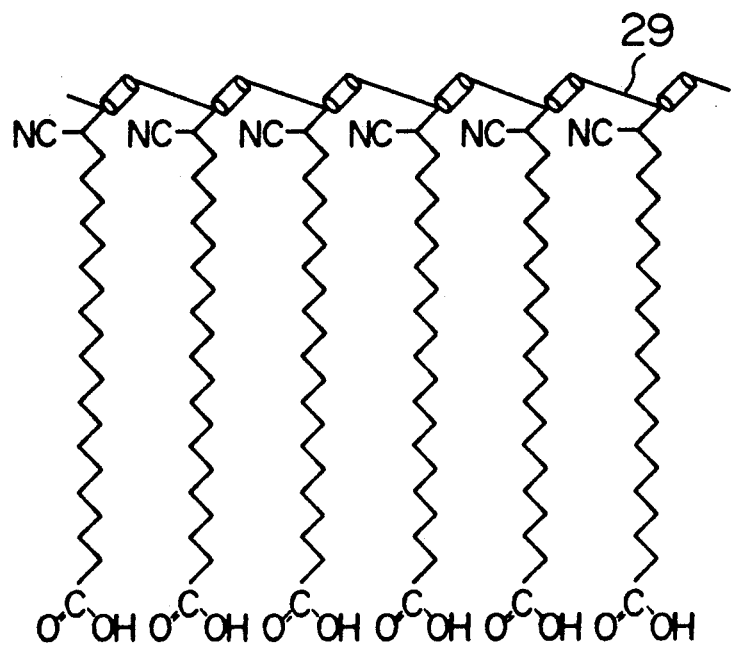

Then, X-rays 28 are irradiated as an energy beam to the monomolecular film 23 formed on the water surface. Also at this time, a magnetic field of the same direction and the same strength is applied similarly to above to make the steric directions of the acetylene groups uniform. The irradiation of X-rays 28 causes acetylene to polymerize, whereby polyacetylene 29 is formed. (Reference is made to FIGS. 8 and 9, FIG. 9 being an enlarged view of the part of FIG. 8 enclosed with a circle.)

Figure 10:
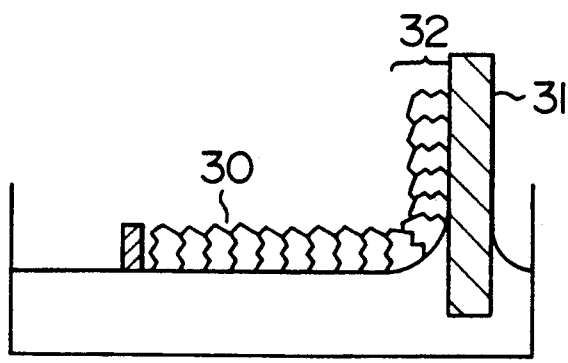

Subsequently, polymer 30 containing polyacetylene formed on the water surface is transferred onto a substrate 31 to form a polyacetylene film 32 (reference is made to FIG. 10).

The third embodiment of the present invention will be described below in detail with reference to schematic drawings.

The straight chain hydrocarbon molecule 40 containing an acetylene group used in the present invention is an ω-tricosynoic acid derivative (CH≡C—CHCl—(CH$_2$)$_{19}$—COOH), in which a chlorine atom is attached to the hydrocarbon of the 3-position. The straight chain hydrocarbon molecules 40 are dissolved in chloroform and allowed to fall dropwise onto a water surface 41 to spread over the surface. After chloroform has been evaporated off, the straight chain hydrocarbon molecules are scraped together by means of a barrier 42 to form a monomolecular film 43 on the water surface while a constant surface pressure is applied thereto.

Figure 11:
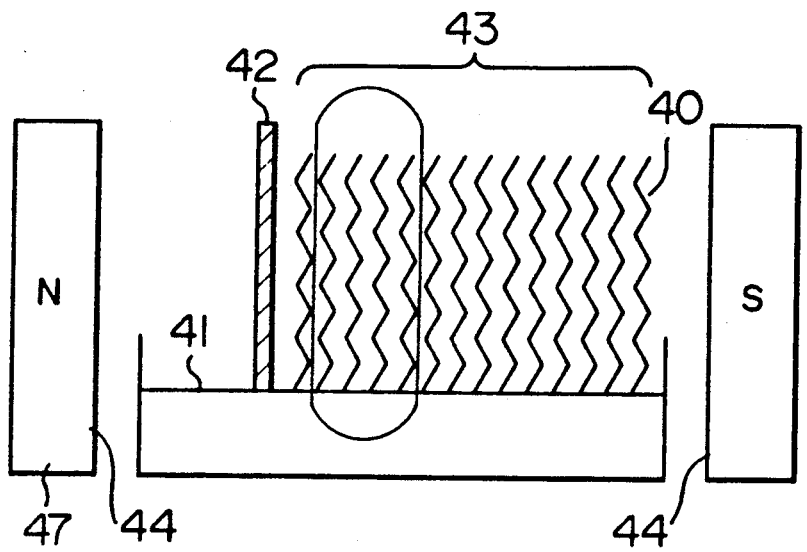
FIGS. 11 to 15 are schematic views illustrating the third embodiment of the present invention.
Figure 12:
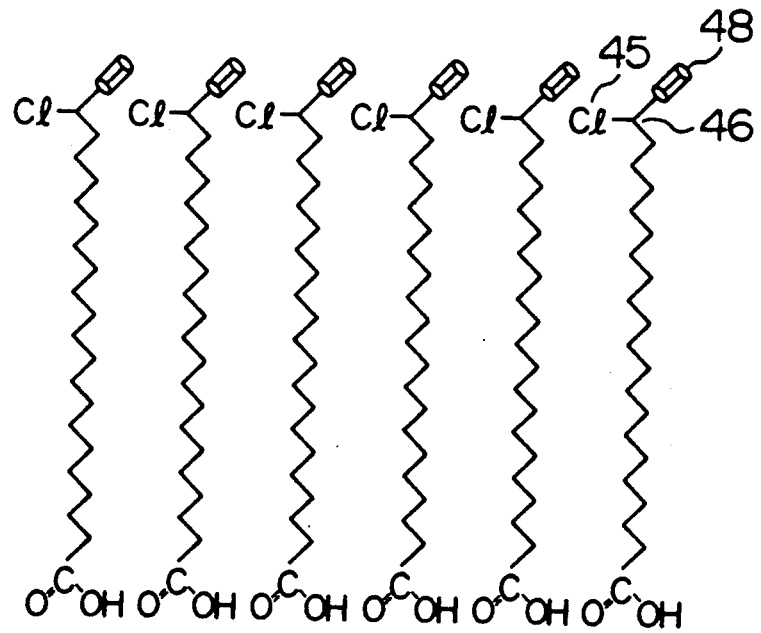

During the time, a magnetic field 44 is simultaneously applied in a direction parallel to the water surface. Under the influence of the magnetic field, the chlorine atom 45 in said straight chain hydrocarbon molecule 40 is directed toward the plus side 47 of the magnetic field owing to polarization between the carbon atom 46 and the chlorine atom 45. In consequence, the steric direction of the acetylene group 48 present in the straight chain hydrocarbon molecule 40 is also determined univocally. This steric direction of the acetylene group is common to the acetylene groups of all of the straight chain hydrocarbon molecules. (Reference is made to FIGS. 11 and 12, FIG. 12 being an enlarged view of the part of FIG. 11 enclosed with a circle.)

Figure 13:
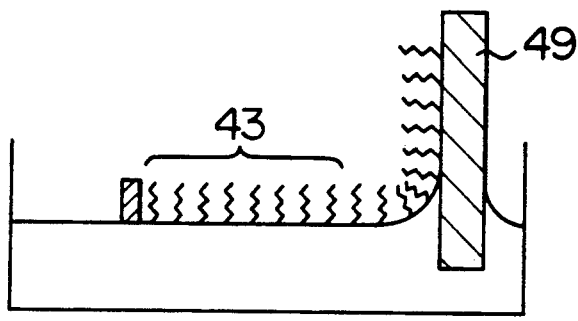

Then, the monomolecular film 43 formed on the water surface 41 is transferred onto a substrate 49 while a constant surface pressure is being applied thereto (reference is made to FIG. 13).

Subsequently, X-rays 50 are irradiated as an energy beam to the monomolecular film 43 transferred onto the substrate 49.

Figure 14:
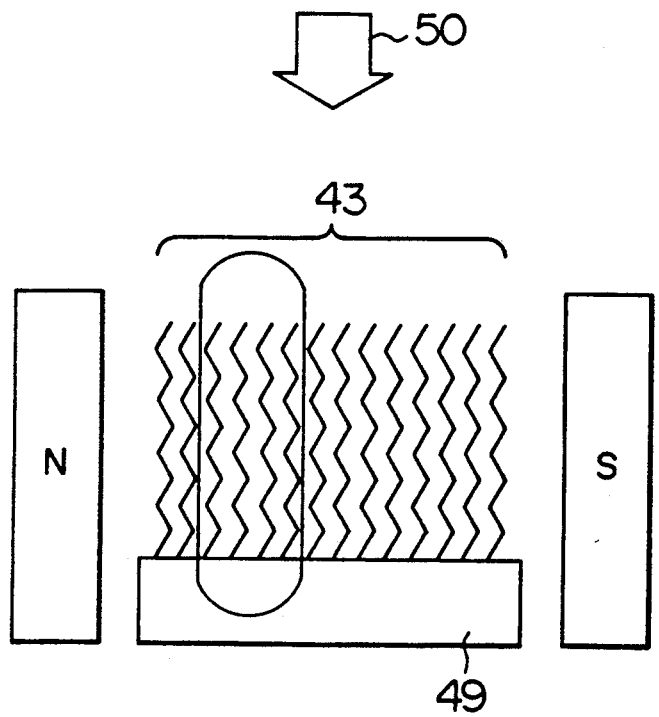
Figure 15:
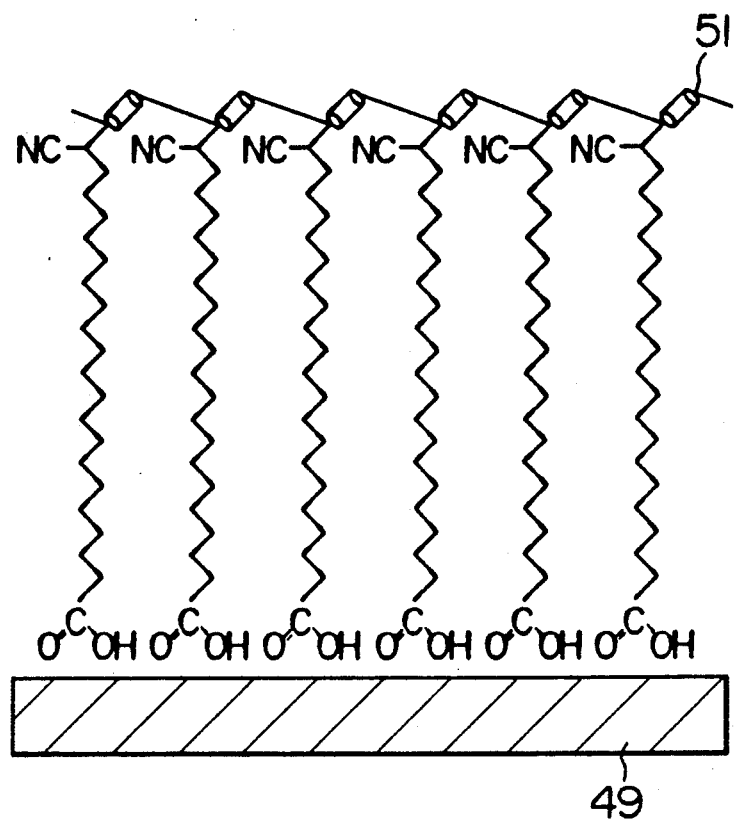

The X-ray irradiation causes the acetylene groups 48 in the monomolecular film to polymerize, whereby a polyacetylene film 51 is formed. Also at this time, a magnetic field of the same direction and the same strength is applied similarly to above to make the steric directions of the acetylene groups uniform. (Reference is made to FIGS. 14 and 15, FIG. 15 being an enlarged view of the part of FIG. 14 enclosed with a circle.)

The fourth embodiment of the present invention will be described below in detail with reference to schematic drawings.

Figure 16:
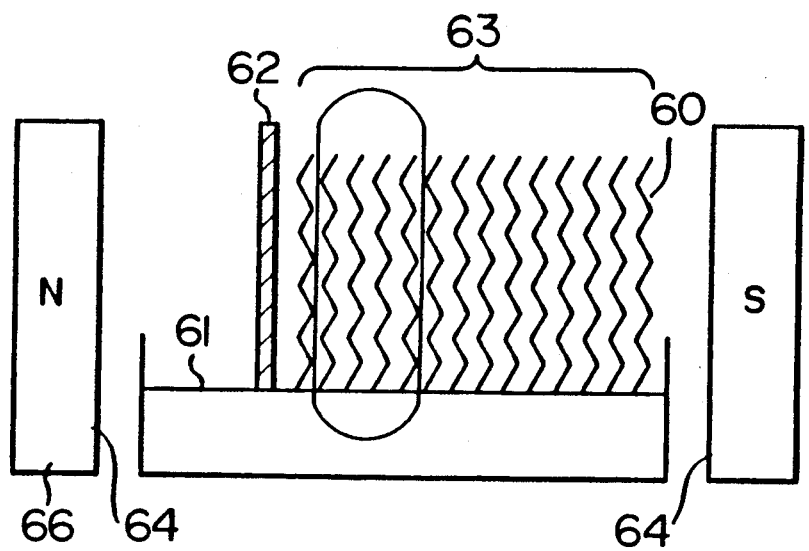
FIGS. 16 to 20 are schematic views illustrating the fourth embodiment of the present invention.
Figure 17:
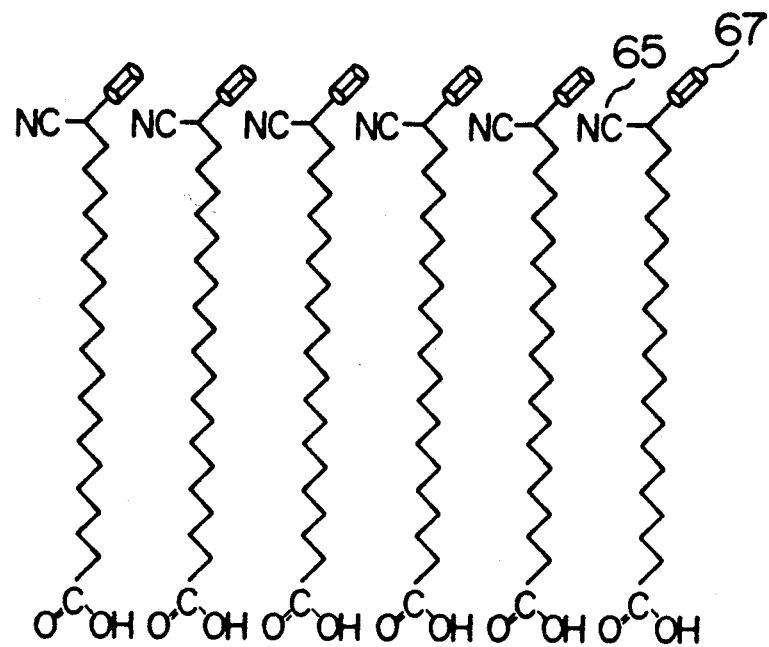

The straight chain hydrocarbon molecule 60 containing an acetylene group used in the present invention is an ω-tricosynoic acid derivative ($CH \equiv C-CH-CN-(CH_2)_{19}-COOH$), in which a cyano group is attached to the carbon atom of the 3-position. The straight chain hydrocarbon molecules 60 are dissolved in chloroform and allowed to fall dropwise onto a water surface 61 to spread over the surface. After chloroform has been evaporated off, the straight chain hydrocarbon molecules 60 are scraped together by means of a barrier 62 to form a monomolecular film 63 on the water surface while a constant surface pressure is applied thereto. During the time, a magnetic field 64 is simultaneously applied in a direction parallel to the water surface. Under the influence of the magnetic field, the cyano group 65 in said straight chain hydrocarbon molecule 60 becomes diamagnetic owing to the spin effect of the unpaired electron of the nitrogen atom in the cyano group and turns toward the plus side 66 of the magnetic field. In consequence, the steric direction of the acetylene group 67 present in the straight chain hydrocarbon molecule 60 is also determined univocally. This steric direction of the acetylene group is common to the acetylene groups of all of the straight chain hydrocarbon molecules. (Reference is made to FIGS. 16 and 17, FIG. 17 being an enlarged view of the part of FIG. 16 enclosed with a circle.)

Figure 18:
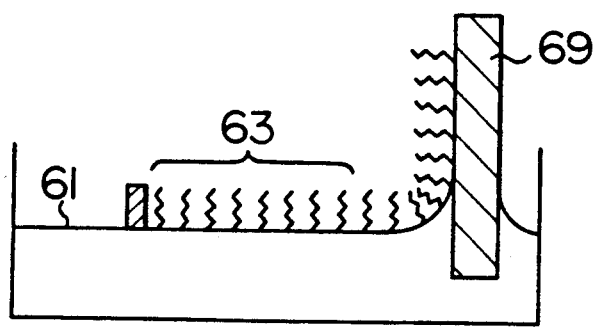

Then, the monomolecular film 63 formed on the water film 61 is transferred onto a substrate 69 while a constant surface pressure is being applied thereto (reference is made to FIG. 18).

Figure 19:
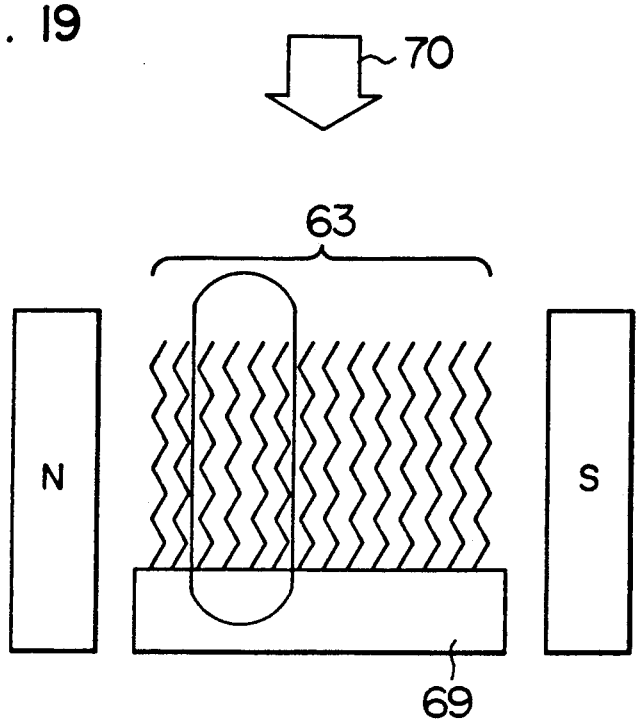
Figure 20:
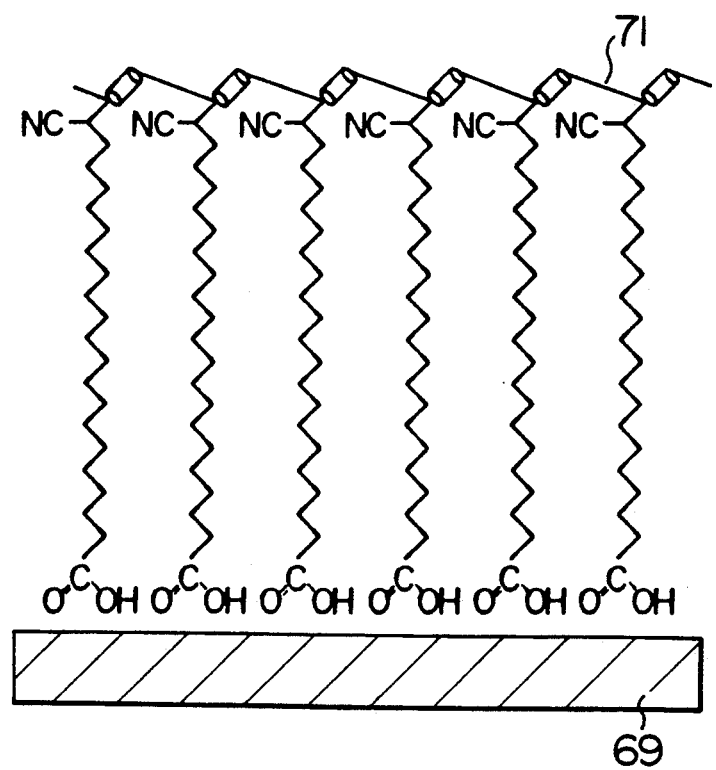

Subsequently, X-rays 70 are irradiated as an energy beam to the monomolecular film 63 transferred onto the substrate 69. The X-ray irradiation causes the acetylene groups 68 in the monomolecular film to polymerize, whereby a polyacetylene film 71 is formed. Also at this time, a magnetic field of the same direction and the same strength is applied similarly to above to make the steric directions of the acetylene groups uniform. (Reference is made to FIGS. 19 and 20, FIG. 20 being an enlarged view of the part of FIG. 19 enclosed with a circle.)

In the first to the fourth embodiments of the present invention described above, a case wherein a monomolecular film is formed while a magnetic field is being applied thereto, then the monomolecular film is transferred onto a substrate and irradiated with an energy beam while a magnetic field is being applied thereto, to effect polymerization and thereby to form polyacetylene, and another case wherein a monomolecular film is formed while a magnetic field is being applied thereto, which is then irradiated with an energy beam while a magnetic field is being applied thereto, to effect polymerization and thereby to form polyacetylene on a water surface, and then the monomolecular film is transferred onto a substrate were shown for either a case wherein the straight chain hydrocarbon derivative containing polyacetylene has a substituent having a polarizability or a case wherein the straight chain hydrocarbon derivative containing polyacetylene has a substituent having an unpaired electron. It is evident, however, that in addition to those described above the following cases also each represent a constituent of the first, second, third and fourth embodiment: (1) a case wherein a monomolecular film formed on a water surface is transferred onto a desired substrate and then irradiated with an energy beam in a magnetic field applied thereto; (2) a case wherein a monomolecular film is formed on a water surface in a magnetic field applied thereto, then transferred onto a desired substrate, and subsequently irradiated with an energy beam; (3) a monomolecular film formed on a water surface is irradiated with an energy beam in a magnetic field applied thereto and then the polyacetylene on the water surface formed by polymerization is transferred onto a substrate; and (4) a monomolecular film is formed on a water surface and the monomolecular film formed on the water surface is irradiated with an energy beam, both in a magnetic field applied thereto, and then the polyacetylene on the water surface formed by polymerization is transferred onto a substrate.

In the first to the fourth embodiments of the present invention, ω-tricosynoic acid ($CH \equiv C-(CH_2)_{20}-COOH$) derivatives were used as straight chain hydrocarbon molecules containing an acetylene group. Irregardless thereof, however, other straight chain hydrocarbon molecules containing an acetylene group may also be used.

The fifth embodiment of the present invention will be described in detail below with reference to schematic drawings.

This embodiment shows a case wherein a straight chain hydrocarbon molecule containing an unpaired electron is used.

Figure 21:
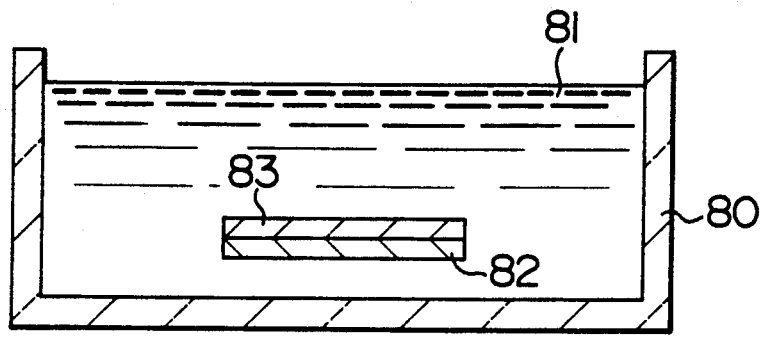
FIGS. 21 to 23 are schematic views illustrating the process for producing polyacetylene of the fifth embodiment of the present invention.

The straight chain hydrocarbon molecule containing an acetylene group used in the present invention is an ω-tricosynoictrichlorosilane derivative ($CH \equiv C-CH-CN-(CH_2)_{19}-SiCl_3$), in which a CN group is attached to the carbon atom of the 3-position and a chlorosilane group is attached to the terminal of the molecular chain. The straight chain hydrocarbon molecules are dissolved in a solution comprising mainly n-hexadecane to form a chemical adsorption liquid 81 in a vessel 80. Then, an optical substrate 82 having a hydrophilic surface, for example an Al substrate whose surface has been oxidized or a Si substrate having a silicon oxide film formed thereon, is immersed in the chemical adsorption liquid 81, whereby the straight chain hydrocarbon molecules are adsorbed by chemical adsorption to form a monomolecular adsorption film 83 on the substrate 82. At this time, the —SiCl group and the —OH group formed on the substrate surface together with $SiO_2$ undergo dehydrochlorination, whereby a monomolecular film of $CH{\equiv}C-CHCN-(CH_2)_{19}-Si-O-$ is formed on the substrate. (Reference is made to FIG. 21.)

Figure 22:
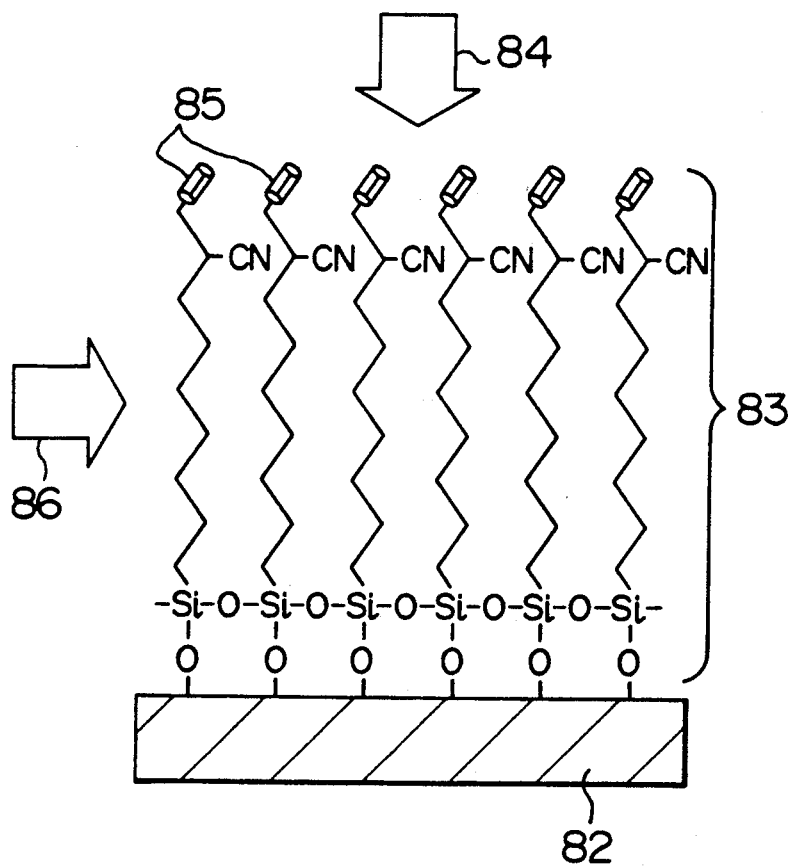
Figure 23:
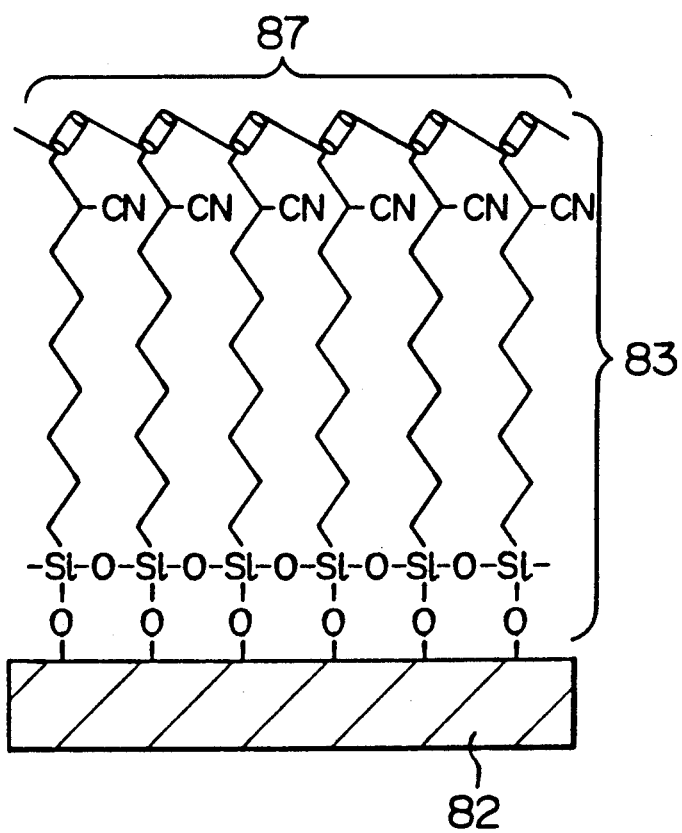
Figure 24:
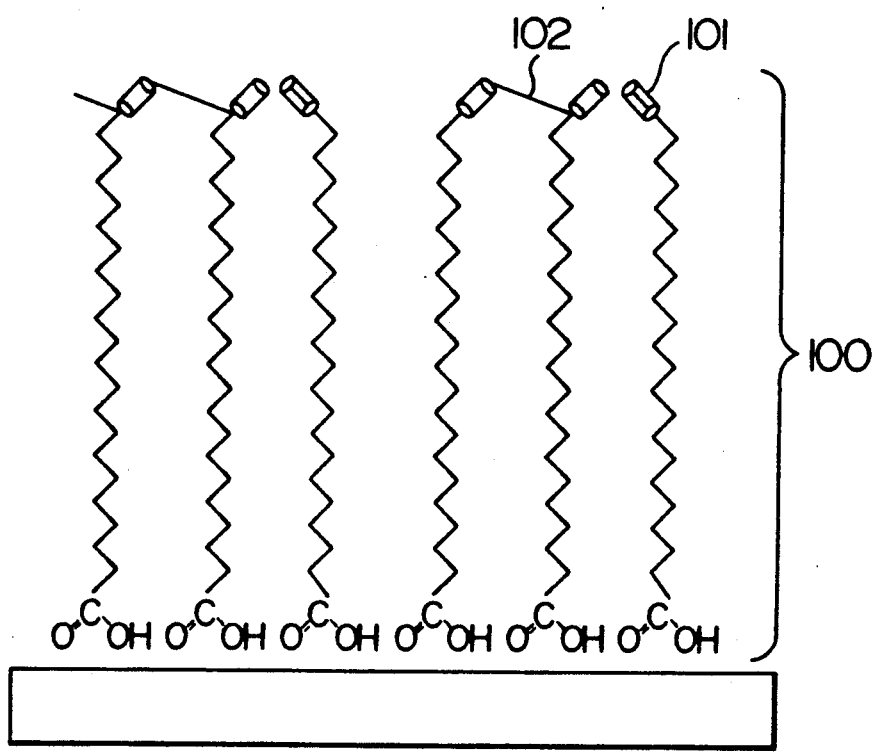
FIGS. 24 and 25 are schematic views each illustrating an example of the prior art.
Figure 25:
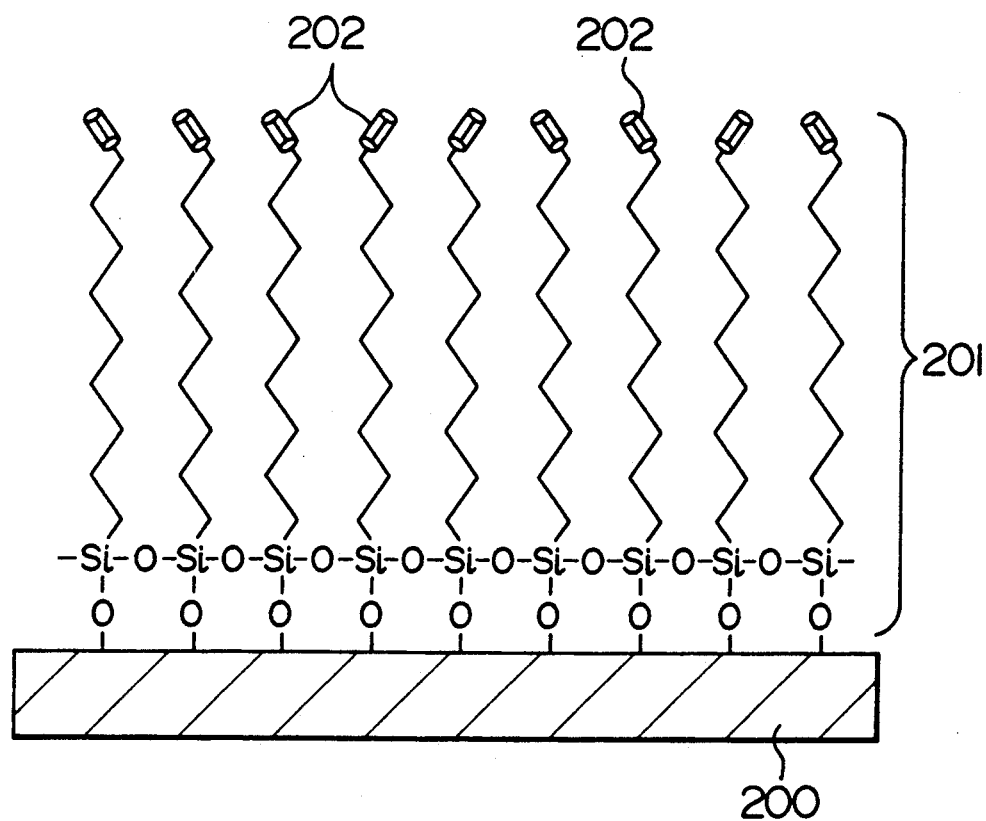

Then, the whole surface of the substrate is irradiated with X-rays 84 as an energy beam to polymerize the acetylene group 85 in said straight chain hydrocarbon molecule. During the time, simultaneously with the X-ray irradiation, a magnetic field 86 is applied at a predetermined angle to the substrate. Under the influence of the magnetic field, the CN group in the hydrocarbon molecule turns towards a definite direction relative to the magnetic field owing to the presence of an unpaired electron in the group. Consequently, the steric direction of the acetylene group 85 present in the hydrocarbon molecule is also determined univocally. This steric direction of the acetylene group is common to the acetylene groups of all the straight chain hydrocarbon molecules. Therefore, irradiation of an energy beam to the monomolecular film at this state results in formation of a polyacetylene film 87 having a very long sequence of conjugated double bonds. (Reference is made to FIGS. 22 and 23.)

In the fifth embodiment of the present invention, an $\omega$-tricosynoictrichlorosilane derivative ($CH{\equiv}C-CH-CN-(CH_2)_{19}-SiCl_3$) was used as the straight chain hydrocarbon molecule. Irregardless thereof, however, other straight chain hydrocarbon molecules containing an acetylene group may also be used.

The second, the fourth and the fifth embodiment of the present invention showed cases wherein the group having an unpaired electron was the CN group. However, said group may be a group having a high polarizability, which includes, for example, —Cl, —F, —$NO_2$ group and —CHO group.

Furthermore, although the second, the fourth and the fifth embodiment of the present invention showed cases wherein the group having an unpaired electron was the —CN group, said group may be other substituents so long as they have an unpaired electron and high spin multiplicity.

Though the first and the third embodiment of the present invention showed cases wherein the group having a high polarizability was the chlorine atom, said group may be —F, —$NO_2$ group, —CHO group, etc.

Though the first to the fifth embodiments of the present invention showed cases wherein polyacetylene was formed as a functional film with X-ray irradiation, a variety of other functional film can be formed according to the present invention. For example, polydiacetylene can be formed by the polymerization of diacetylene.

Moreover, although the straight chain hydrocarbon molecules were arranged in order by the use of a magnetic field in the first to the fifth embodiments of the present invention, such arranging may also be accomplished by the use of an electric field.

Furthermore, although the first to the fifth embodiments of the present invention showed cases which involve the use of a monomolecular film, it is evident that the effect according to the present invention can be obtained also for built-up films.

By using the present invention, polyacetylene excellent in electric conductivity and non-linear optical effect can be produced with good efficiency. Furthermore, since conjugated double bonds can be formed in series theoretically according to the process of the invention, an ultra-high molecular weight polyacetylene of a very long straight chain which was not obtainable previously can be produced, so that the process of the present invention is highly useful for producing devices which utilize the non-linear optical effect. Moreover, hyperconjugated double bonds are supposed to give a superconductivity, and the present invention has a potentiality of making it possible to produce an ordinary-temperature superconductive material.

What is claimed is:

1. A process for producing a polyacetylene film comprising the steps of spreading organic molecules being a straight-chain hydrocarbon with an acetylene group (—C${\equiv}$C—) having a highly polarizable group or a group having an unpaired electron with one end of the group being formed of a hydrophilic group and the other end with a hydrophobic group, dissolved in an organic solvent over a water surface, evaporating off said organic solvent, gathering the organic molecules containing the acetylene group spread over the water surface, and then applying a surface pressure thereto to form a monomolecular film of the organic molecules on the water surface, transferring said monomolecular film onto a substrate, irradiating said monomolecular film with an energy beam to thereby polymerize the acetylene group in said organic film to form a polyacetylene film, in which, after the acetylene monomolecular film has been transferred onto the substrate, the acetylene monomolecular film is irradiated by the energy beam to form the polyacetylene film while a magnetic field is being applied to the film.

2. A process for producing a polyacetylene film, comprising the steps of spreading organic molecules being a straight-chain hydrocarbon with an acetylene group (—C${\equiv}$C—) having a highly polarizable group or a group having an unpaired electron with one end of the group being formed of a hydrophilic group and the other end with a hydrophobic group, dissolved in an organic solvent, over a water surface, evaporating off said organic solvent, gathering said organic molecules containing the acetylene group spread over the water surface, and then applying a surface pressure thereto to form a monomolecular film of the organic molecules on the water surface, transferring said monomolecular film onto a substrate, irradiating said monomolecular film with an energy beam to thereby polymerize the acetylene group in said organic film to form a polyacetylene film, in which, after evaporating off said organic solvent, gathering said organic molecules containing an acetylene group and applying a surface pressure on the water surface while a magnetic field is being applied thereto, transferring the monomolecular film onto the substrate, and then irradiating the acetylene monomolecular film with the energy beam to form the polyacetylene film.

3. A process for producing a polyacetylene film comprising the steps of spreading organic molecules being a straight-chain hydrocarbon with an acetylene group (—C${\equiv}$C—) having a highly polarizable group or a group having an unpaired electron with one end of the group being formed of a hydrophilic group and the other end with a hydrophobic group, dissolved in an organic solvent, over a water surface, evaporating off the organic solvent, gathering said organic molecules containing the acetylene group spread over the water surface, and then applying a surface pressure thereto to form a monomolecular film of the organic molecules on the water surface, transferring said monomolecular film onto a substrate, irradiating said monomolecular film with an energy beam to thereby polymerize the acetylene group in said organic molecule, to form a polyacetylene film, while a magnetic field is being applied thereto.

4. A process for producing a polyacetylene film comprising the steps of spreading organic molecules being a straight-chain hydrocarbon with an acetylene group (—C≡C—) having a highly polarizable group or a group having an unpaired electron with one end of the group being formed of a hydrophilic electron and the other end with a hydrophobic group, dissolved in an organic solvent, over a water surface, evaporating off said organic solvent gathering the organic molecules containing the acetylene group spread over the water surface, and then applying a surface pressure thereto to form a monomolecular film of the organic molecules on the water surface, irradiating said monomolecular film with an energy beam to thereby polymerize the acetylene group in said organic molecule, to form a polyacetylene film, in which the monomolecular film formed on the water surface is irradiated by the energy beam while a magnetic field is being applied thereto, and then transferring the polyacetylene formed by polymerization on the water surface onto the substrate.

5. A process for producing a polyacetylene film comprising the steps of spreading organic molecules being a straight-chain hydrocarbon with an acetylene group (—C≡C—) having a highly polarizable group or a group having an unpaired electron with one end of the group being formed of a hydrophilic group and the other end with a hydrophobic group, dissolved in an organic solvent, over a water surface, evaporating off said organic solvent, gathering the organic molecules containing the acetylene group spread over the water surface, and then applying a surface pressure thereto to form a monomolecular film of the organic molecules on the water surface, transferring said monomolecular film onto a substrate, irradiating said monomolecular film with an energy beam to thereby polymerize the acetylene group in said organic molecule, in which the monomolecular film formed on the water surface is subjected to a magnetic field and transferring the polyacetylene film formed by polymerization on the substrates.

6. A process for producing a polyacetylene film comprising the steps of spreading organic molecules being a straight-chain hydrocarbon with an acetylene group (—C≡C—) having a highly polarizable group or a group having an unpaired electron with one end of the group being formed of a hydrophilic group and the other end with a hydrophobic group, dissolved in an organic solvent, over a water surface, evaporating off said organic solvent, gathering said organic molecules containing the acetylene group spread over the water surface, and then applying a surface pressure thereto to form a monomolecular film of the organic molecules on the water surface, transferring said monomolecular film onto a substrate, irradiating said monomolecular film with an energy beam to thereby polymerize the acetylene group in said organic film to form a polyacetylene film, while a magnetic field is being applied thereto.

7. A process for producing a polyacetylene according to any of claims 1-6, wherein the organic molecule containing an acetylene group is composed of a straight chain hydrocarbon molecule, one terminal thereof being formed of a hydrophilic group and the other terminal being formed of a hydrophobic group, and has a substituent of a high polarizability at a position in said straight chain hydrocarbon molecule.

8. A process for producing polyacetylene according to any of claims 1-6, wherein the organic molecule containing an acetylene group is composed of a straight chain hydrocarbon molecule, one terminal thereof being formed of a hydrophilic group and the other terminal being formed of a hydrophobic group, and has a substituent having an unpaired electron at a position in said straight chain hydrocarbon molecule.

9. A process for producing polyacetylene which comprises a step of immersing a hydrophilic substrate in a solution of organic molecules which have a chlorosilane group at one terminal of a straight chain hydrocarbon molecule and have an acetylene group (—C≡C—) at a position of the principal chain dissolved therein, thereby forming a monomolecular film of said organic molecules on said substrate by chemical adsorption, a step of applying a magnetic field to said monomolecular film formed on said substrate, and a step of irradiating an energy beam to said monomolecular film, thereby polymerizing the acetylene group present in said organic molecule.

10. A process for producing polyacetylene according to claim 9, wherein said organic molecule has a substituent of a high polarizability at a position in the straight chain hydrocarbon molecule.

11. A process for producing polyacetylene according to claim 9, wherein said organic molecule has a substituent having an unpaired electron at a position in the straight chain hydrocarbon molecule.

* * * * *